US009485769B2

(12) United States Patent
Kim et al.

(10) Patent No.: US 9,485,769 B2
(45) Date of Patent: Nov. 1, 2016

(54) METHOD AND APPARATUS FOR DETERMINING OPERATING CHANNEL IN WIRELESS COMMUNICATION SYSTEM

(71) Applicant: LG Electronics Inc., Seoul (KR)

(72) Inventors: Suhwook Kim, Gyeonggi-do (KR); Wookbong Lee, Gyeonggi-do (KR); Jinsam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 76 days.

(21) Appl. No.: 14/396,443

(22) PCT Filed: Apr. 25, 2013

(86) PCT No.: PCT/KR2013/003573
§ 371 (c)(1),
(2) Date: Oct. 23, 2014

(87) PCT Pub. No.: WO2013/162306
PCT Pub. Date: Oct. 31, 2013

(65) Prior Publication Data
US 2015/0078287 A1     Mar. 19, 2015

Related U.S. Application Data

(60) Provisional application No. 61/638,467, filed on Apr. 25, 2012.

(51) Int. Cl.
*H04W 72/04* (2009.01)
*H04W 84/12* (2009.01)
*H04W 16/14* (2009.01)

(52) U.S. Cl.
CPC ......... *H04W 72/0453* (2013.01); *H04W 16/14* (2013.01); *H04W 84/12* (2013.01)

(58) Field of Classification Search
None
See application file for complete search history.

(56) References Cited

U.S. PATENT DOCUMENTS

2011/0116458 A1* 5/2011 Hsu .................. H04W 16/14
                                                                370/329
2012/0201213 A1* 8/2012 Banerjea ........... H04W 72/0453
                                                                370/329

(Continued)

FOREIGN PATENT DOCUMENTS

WO     2011/102652 A2     8/2011
WO     2012/015133 A1     2/2012

OTHER PUBLICATIONS

International Search Report dated Aug. 22, 2013, issued by the International Search Authority in International Application No. PCT/KR2013/003573.

(Continued)

*Primary Examiner* — Chi H Pham
*Assistant Examiner* — Soon-Dong D Hyun
(74) *Attorney, Agent, or Firm* — Morgan, Lewis & Bockius LLP

(57) ABSTRACT

The present invention relates to a wireless communication system and, more specifically, to a method and an apparatus for determining an operating channel. The method for determining the operating channel of a station (STA) in a TV whitespace (TVWS) wireless LAN system, according to one embodiment of the present invention, comprises the steps of: receiving information on an index which indicates an operating class including channel start frequency, channel spacing, and channel set parameters; and determining a main frequency of the operating channel on the basis of the parameters indicated by the index of the operating class. The main frequency of the operating channel can be determined on the basis of a correction value which is set differently according to the configuration of a basic channel unit of the operating channel.

11 Claims, 9 Drawing Sheets

(56) References Cited

U.S. PATENT DOCUMENTS

| | | | |
|---|---|---|---|
| 2012/0314681 A1* | 12/2012 | Chen | H04W 52/243 370/329 |
| 2013/0079046 A1* | 3/2013 | Chen | H04W 16/14 455/509 |
| 2013/0301556 A1* | 11/2013 | Porat | H04L 1/0071 370/329 |
| 2013/0336239 A1* | 12/2013 | Yucek | H04W 72/0453 370/329 |
| 2014/0307634 A1* | 10/2014 | Lee | H04W 16/14 370/329 |

OTHER PUBLICATIONS

Reznik, Alex et al., "Channel Selection Support in TVWS," (Year:2010, Dcn:104, Rev.0) IEEE 802.19 Document, Jul. 14, 2010.

* cited by examiner (a)

(b)

(c)

METHOD AND APPARATUS FOR DETERMINING OPERATING CHANNEL IN WIRELESS COMMUNICATION SYSTEM

TECHNICAL FIELD

The present invention relates to a wireless communication system and, more particularly, a method for determining an operating channel, and an apparatus therefor.

BACKGROUND ART

Standards for Wireless Local Area Network (WLAN) technology are established by the Institute of Electrical and Electronics Engineers (IEEE) 802.11 standards committee. IEEE 802.11a and IEEE 802.11b respectively provide data rates of 54 Mbps and 11 Mbps using unlicensed bands of 2.4 GHz and 5 GHz. IEEE 802.11g adopts Orthogonal Frequency Divisional Multiplexing (OFDM) at 2.4 GHz and provides a data rate of 54 Mbps. IEEE 802.11n adopts Multiple Input Multiple Output (MIMO)-OFDM and provides a data rate of 300 Mbps for four spatial streams. IEEE 802.11n supports a channel bandwidth up to 40 MHz and provides a data rate of 600 Mbps.

A communication scheme for allowing operations of unlicensed users in frequency bands basically defined for use of licensed users is under discussion. Here, frequency bands temporarily not used by licensed users may be called whitespace and, particularly, whitespace in TV bands may be called TV Whitespace (TVWS).

The IEEE 802.11af standard for defining operations of unlicensed devices in TVWS bands is currently under development.

TVWS includes Very High Frequency (VHF) bands (54 to 60, 76 to 88, and 174 to 216 MHz) and an Ultra High Frequency (UHF) band (470 to 698 MHz) allocated for TV broadcast, and refers to frequency bands allowed for use of unlicensed devices on condition that they do not disturb communication of licensed devices (TV broadcasts, wireless microphones, etc.) operating in the frequency bands.

512 to 608 MHz and 614 to 698 MHz bands are allowed for operation of all unlicensed devices except for some special cases, but 54 to 60 MHz, 76 to 88 MHz, 174 to 216 MHz, and 470 to 512 MHz bands are allowed for communication between fixed devices only. The fixed device refers to a device which transmits data at a fixed location only. In the following description, whitespace bands include the above-described TVWS, but are not limited thereto.

An unlicensed device which desires to use a whitespace band should provide a function of protecting licensed devices. Accordingly, the unlicensed device should check whether a whitespace band is occupied by a licensed device, before starting transmission in the whitespace band. That is, the unlicensed device may be allowed to use the whitespace band only when a licensed device is not using the whitespace band.

In this regard, the unlicensed device should access a Geo-location Database (GDB) via the Internet or a dedicated network to acquire information about a list of channels (i.e., a set of channels) available in a corresponding area. The GDB is a database for storing and managing device information of licensed devices registered therein and channel usage information dynamically changed depending on geographical locations and channel use times of the licensed devices. To solve a problem of coexistence of unlicensed devices using the whitespace, a signaling protocol, e.g., common beacon frame, and a spectrum sensing mechanism may be used.

In the IEEE 802.11 system, a TVWS device may refer to an unlicensed device operating in a TVWS spectrum using a Medium Access Control (MAC) layer and a Physical (PHY) layer of IEEE 802.11. In this specification, unless otherwise mentioned, a Station (STA) refers to a TVWS device operating in a TVWS spectrum.

An STA should provide a function of protecting incumbent or primary users having access priority and including licensed users (e.g., TV user, wireless microphone, etc.). That is, when an incumbent user is using TVWS, the STA should stop using a corresponding channel. Accordingly, the STA should determine a channel available to unlicensed devices (i.e., a channel not used by a licensed device) and operate on the available channel.

The STA may determine an available channel by performing a spectrum sensing mechanism or by accessing a GDB to determine a TV channel schedule. The spectrum sensing mechanism may include energy detection (a scheme for determining that an incumbent user is using a channel if the intensity of a received signal is equal to or greater than a certain value), feature detection (a scheme for determining that an incumbent user is using a channel if a digital TV preamble is detected), etc. Then, the STA should access the GDB to acquire GDB information based on location information thereof to check whether a licensed device is using a channel at the location. Access to and information acquisition from the GDB should be performed a sufficient number of times to protect the licensed device.

Upon determining that an incumbent user is using a channel immediately next to a currently used channel through the spectrum sensing mechanism or GDB, a terminal (or STA) and a base station (or Access Point (AP)) may protect the incumbent user by reducing transmit power.

DISCLOSURE

Technical Problem

When operations of unlicensed users are permitted in a frequency band basically defined to be used by licensed users (or incumbent users), a method for minimizing interference of the unlicensed users to the licensed users and allowing efficient use of radio resources by the unlicensed users is required.

An object of the present invention devised to solve the problem lies in a new method for determining an operating channel in a TVWS band.

It is to be understood that both the foregoing general description and the following detailed description of the present invention are exemplary and explanatory and are intended to provide further explanation of the invention as claimed.

It is to be understood that both the foregoing general description and the following detailed description of the present invention are exemplary and explanatory and are intended to provide further explanation of the invention as claimed.

Technical Solution

The object of the present invention can be achieved by providing a method for determining an operating channel of a Station (STA) in a TV Whitespace (TVWS) Wireless Local Area Network (WLAN) system, the method including receiving information about an index indicating an operating class and including channel starting frequency, channel spacing and channel set parameters, and determining a center frequency of the operating channel based on the parameters indicated by the index of the operating class, wherein the center frequency of the operating channel is determined based on $f_c^k = f_s + m * n_k + \text{Correction}$, where $f_c^k$ is a center frequency of a k-th operating channel, $f_s$ is the channel starting frequency, m is a channel number multiplier, $n_k$ is a channel number of the k-th operating channel, and Correction is a correction value of the center frequency.

In another aspect of the present invention, provided herein is a Station (STA) apparatus for determining an operating channel in a TV Whitespace (TVWS) Wireless Local Area Network (WLAN) system, the STA apparatus including a transceiver and a processor, wherein the processor is configured to receive information about an index indicating an operating class and including channel starting frequency, channel spacing and channel set parameters, and to determine a center frequency of the operating channel based on the parameters indicated by the index of the operating class, and wherein the center frequency of the operating channel is determined based on $f_c^k = f_s + m * n_k + \text{Correction}$, where $f_c^k$ is a center frequency of a k-th operating channel, $f_s$ is the channel starting frequency, m is a channel number multiplier, $n_k$ is a channel number of the k-th operating channel, and Correction is a correction value of the center frequency.

The following may be commonly applied to the above method and the STA apparatus.

Correction may have a value of 0 if the operating channel is composed of one basic channel unit, and Correction may have a value of the basic channel unit/2 if the operating channel is composed of two contiguous basic channel units.

In this case, m may be determined based on spacing between adjacent TV channels.

Furthermore, m is a greatest common divisor of a plurality of values of spacing between adjacent TV channels.

Specifically, m may be 6.

In addition, $n_k$ may be a natural number.

A single operating class index may indicate a plurality of different channel starting frequency values.

When the operating channel is composed of one basic channel unit, Correction may have a value of −(B−W)/2 in a low frequency alignment channelization method, have a value of 0 in a middle frequency alignment channelization method, and have a value of (B−W)/2 in a high frequency alignment channelization method, where B is a bandwidth of a TV channel and W is a bandwidth of the operating channel.

When the operating channel is composed of two contiguous basic channel units, Correction may have a value of −B/2+W in a low frequency alignment channelization method, have a value of B/2 in a middle frequency alignment channelization method, have a value of 3B/2−W in a high frequency alignment channelization method, have a value of W/2 in a middle frequency alignment channelization method based on a low-frequency basic channel unit, and have a value of B−W/2 in a middle frequency alignment channelization method based on a high-frequency basic channel unit, where B is a bandwidth of a TV channel and W is a bandwidth of the operating channel.

The information about the index indicating the operating class may be received in a beacon frame or a probe response frame from an Access Point (AP).

It is to be understood that both the foregoing general description and the following detailed description of the present invention are exemplary and explanatory and are intended to provide further explanation of the invention as claimed.

Advantageous Effects

According to the present invention, a new method for determining an operating channel may be provided.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
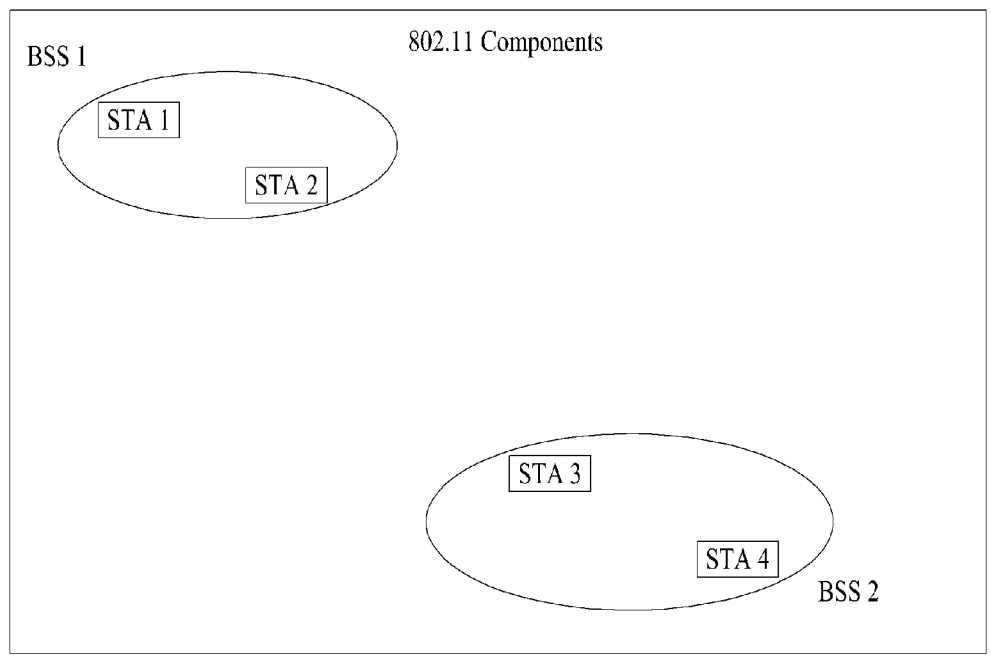
FIG. 1 is a view illustrating an exemplary architecture of the IEEE 802.11 system to which the present invention is applicable.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Embodiments described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by these documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. For clarity, this application focuses on the IEEE 802.11 system. However, the technical features of the present invention are not limited thereto.

FIG. 1 is a view illustrating an exemplary architecture of the IEEE 802.11 system to which the present invention is applicable.

The IEEE 802.11 architecture may be composed of a plurality of components and provide a WLAN supporting Station (STA) mobility transparent to higher layers according to interaction of the components. A Basic Service Set (BSS) may correspond to a basic component block in IEEE 802.11 LAN. FIG. 1 exemplarily shows two BSSs (BSS1 and BSS2) each including two STAs as members (STA1 and STA2 are included in BSS1, and STA3 and STA4 are included in BSS2). In FIG. 1, an oval that defines a BSS may indicate a coverage area in which STAs belonging to the BSS perform communication. This area may be called a Basic Service Area (BSA). When an STA moves out of the BSA, the STA may not directly communicate with other STAs in the BSA.

The most basic type of BSS in IEEE 802.11 LAN is an Independent BSS (IBSS). For example, the IBSS may have a minimum configuration including only two STAs. The BSS (BSS1 or BSS2) shown in FIG. 1, which has the simplest form and in which components other than STAs are omitted, is a representative example of the IBSS. This configuration is possible when STAs can directly communicate with each other. This type of LAN may be configured as necessary rather than being previously designed, and may be called an ad-hoc network.

When an STA is switched on or off, or enters or exits the coverage of a BSS, membership of the STA in the BSS may be dynamically changed. To become a member of the BSS, the STA may join the BSS using a synchronization procedure. To access all services based on the BSS, the STA should be associated with the BSS. Association may be dynamically set and may use a Distribution System Service (DSS).

Figure 2:
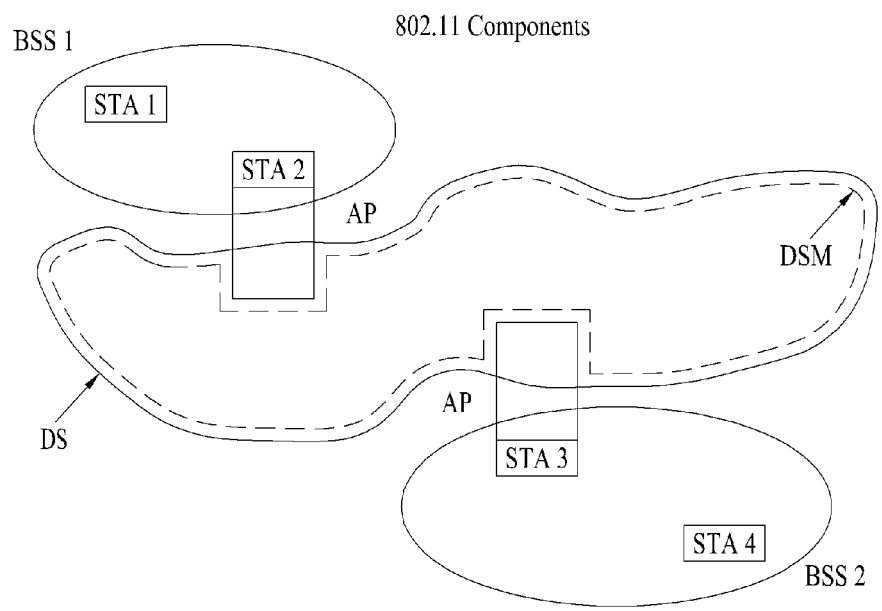
FIG. 2 is a view illustrating another exemplary architecture of the IEEE 802.11 system to which the present invention is applicable.

FIG. 2 is a view illustrating another exemplary architecture of the IEEE 802.11 system to which the present invention is applicable. FIG. 2 shows a Distribution System (DS), a Distribution System Medium (DSM), and an Access Point (AP) in addition to the architecture of FIG. 1.

In a LAN, a direct station-to-station distance may be restricted by PHY performance. This distance restriction may be sufficient in some cases, but communication between stations having a long distance therebetween may be necessary in other cases. The DS may be configured to support an extended coverage.

The DS refers to an architecture in which BSSs are connected to each other. Specifically, BSSs may be present as components of an extended form of a network composed of a plurality of BSSs rather than being independently present as shown in FIG. 1.

The DS is a logical concept and may be specified by characteristics of the DSM. In this regard, the IEEE 802.11 standard logically discriminates a Wireless Medium (WM) from the DSM. These logical media are used for different purposes by different components. The IEEE 802.11 standard does not limit these media to the same medium or different media. The flexibility of the IEEE 802.11 LAN architecture (DS architecture or another network architecture) is explained in that a plurality of media are logically different from each other. That is, the IEEE 802.11 LAN architecture may be implemented in various manners and each LAN architecture may be specified by physical characteristics of implementation.

The DS may support mobile devices by providing seamless integration of a plurality of BSSs and providing logical services required to manage addresses to destinations.

The AP refers to an entity which allows associated STAs to access the DS via a WM and has STA functionality. Data may be exchanged between a BSS and the DS via the AP. For example, STA2 and STA3 illustrated in FIG. 2 have STA functionality and provide a function of allowing associated STAs (STA1 and STA4) to access the DS. Further, all APs are addressable entities because they basically correspond to STAs. An address used by an AP for communication on the WM is not necessarily the same as an address used by the AP for communication on the DSM.

Data transmitted from one of STAs associated with an AP to an STA address of the AP may always be received by an uncontrolled port and processed by an IEEE 802.1X port access entity. Further, the transmitted data (or frame) may be delivered to the DS if a controlled port is authenticated.

Figure 3:
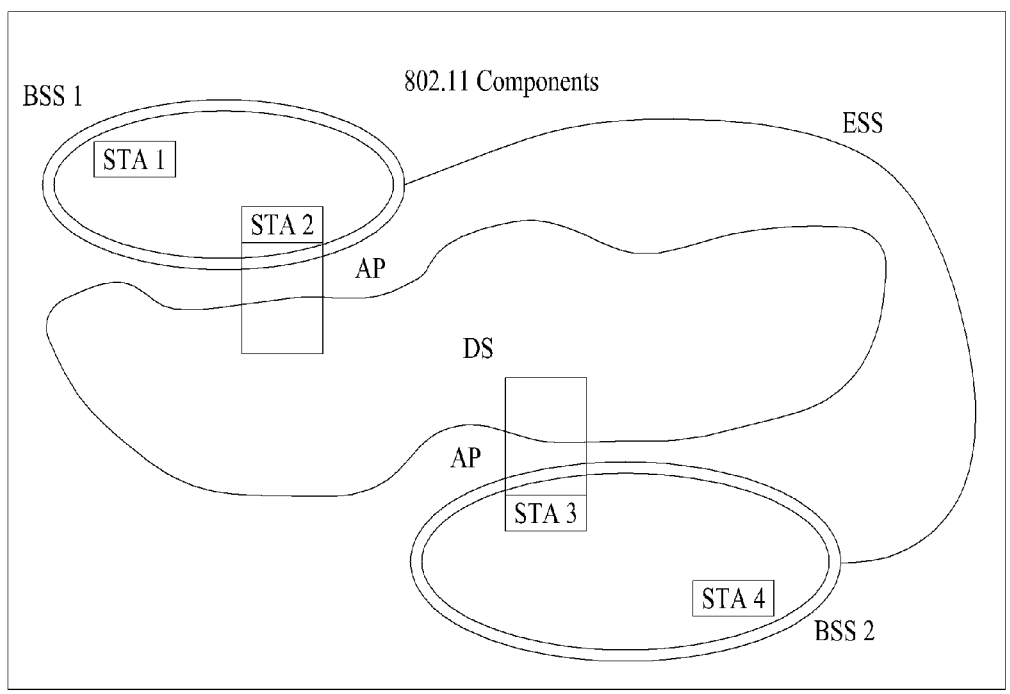
FIG. 3 is a view illustrating another exemplary architecture of the IEEE 802.11 system to which the present invention is applicable.

FIG. 3 is a view illustrating another exemplary architecture of the IEEE 802.11 system to which the present invention is applicable. FIG. 3 conceptually shows an Extended Service Set (ESS) for providing an additional coverage to the architecture of FIG. 2.

A wireless network having an arbitrary size and complexity may be composed of a DS and an ESS. This type of network is called an ESS network in the IEEE 802.11 system. The ESS may correspond to a set of BSSs connected to a DS. However, the ESS does not include the DS. The ESS network looks like an IBSS network on a Logical Link Control (LLC) layer. STAs included in the ESS may communicate with each other and mobile STAs may move from a BSS to another BSS (in the same ESS) transparently to the LCC layer.

IEEE 802.11 defines nothing about relative physical locations of BSSs in FIG. 3 and any of the following is possible. The BSSs may partially overlap, which is a form generally used to provide continuous coverage. The BSSs may not be physically connected to each other and the logical distance between the BSSs has no restriction. In addition, the BSSs may be physically located at the same location to provide redundancy. Further, one (or more) IBSS(s) or ESS n etwork(s) may be physically located in the same space as one (or more) ESS network(s). This may correspond to a form of an ESS network when an ad-hoc network operates at a location where the ESS network is present, when physically overlapping IEEE 802.11 networks are configured by different organizations, or when two or more different access and security policies are required at the same location.

Figure 4:
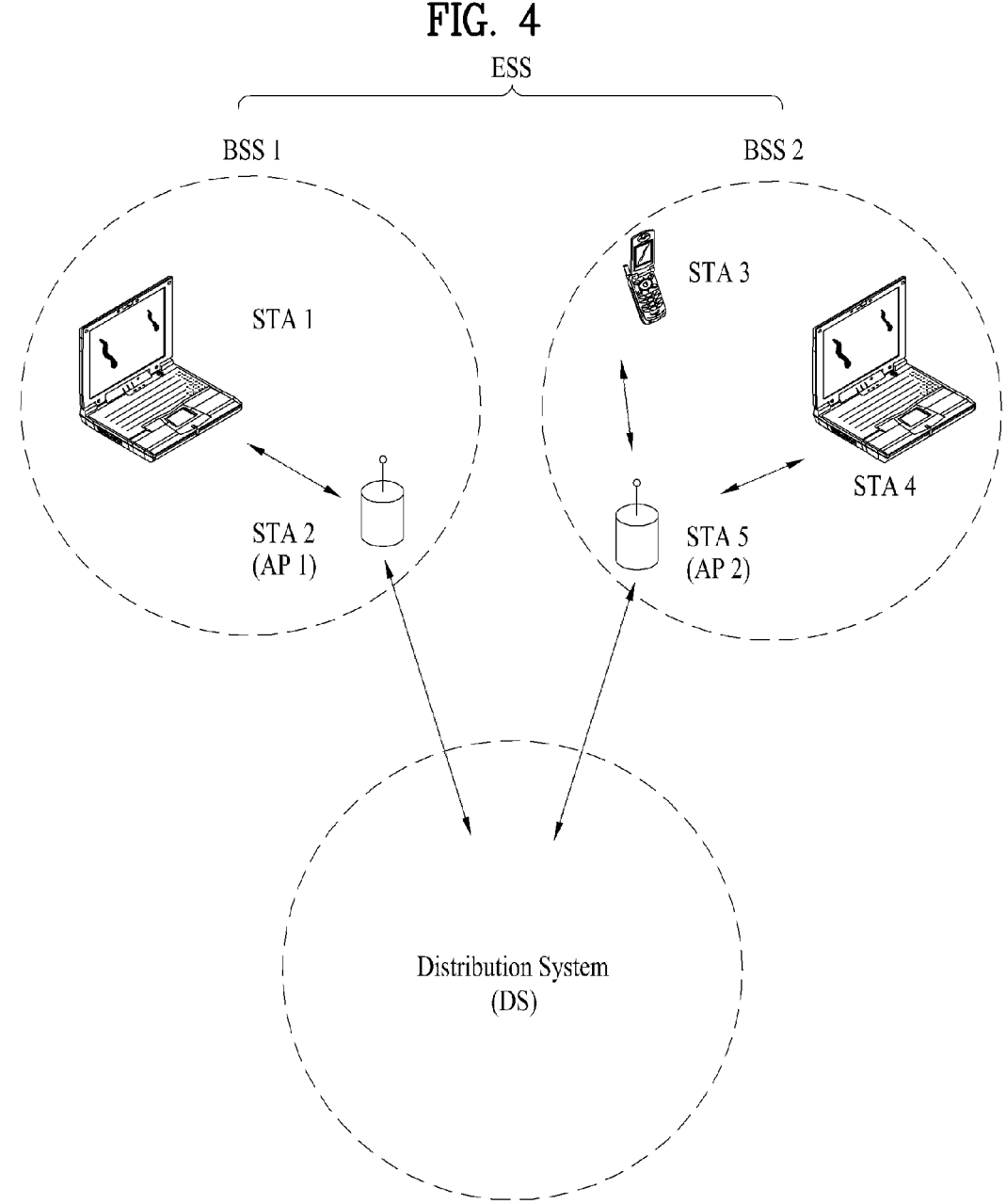
FIG. 4 is a view illustrating an exemplary architecture of a WLAN system.

FIG. 4 is a view illustrating an exemplary architecture of a WLAN system. FIG. 4 illustrates an example of BSSs based on an architecture including a DS.

In FIG. 4, BSS1 and BSS2 form an ESS. In the WLAN system, STAs are devices operating according to MAC/PHY regulations of IEEE 802.11. The STAs include an AP STA and a non-AP STA. The non-AP STA corresponds to a device generally managed directly by a user, e.g., a laptop computer, mobile phone, etc. In FIG. 4, STA1, STA3 and STA4 correspond to the non-AP STAs, and STA2 and STA5 correspond to the AP STAs.

In the following description, the non-AP STA may be called a terminal, Wireless Transmit/Receive Unit (WTRU), User Equipment (UE), Mobile Station (MS), mobile terminal, Mobile Subscriber Station (MSS), etc. The AP corresponds to a Base Station (BS), Node-B, evolved Node-B (eNB), Base Transceiver System (BTS), femto BS, etc. in other wireless communication fields.

Available Channel in Whitespace

For operation of an STA in whitespace, protection of licensed devices (or incumbent users) should be preferentially provided. Accordingly, the STA should determine a channel not used by a licensed device and thus available to unlicensed devices, and operate on the available channel. If a channel being used by the STA is no longer available, the STA should stop using the channel.

To check channel (e.g., TV channel) availability in whitespace (e.g., TVWS), the STA may perform spectrum sensing or access a GDB to determine a TV channel schedule. GDB information may include channel usage information, for example, a schedule (e.g., time) for using a specific channel by a licensed device at a specific location. The STA which desires to check availability of a TV channel should access the GDB via the Internet, etc. to acquire GDB information based on location information thereof. This operation should be performed at an interval sufficient to protect licensed devices.

In this specification, information about available channels and frequencies, which is received from the GDB, is called a Whitespace Map (WSM). The WSM is a map of information about channels available to unlicensed devices in TVWS bands based on the channel and frequency information acquired by an STA from the GDB. The WSM may include information about a list of channels or frequencies available to unlicensed devices. Channels included in the available channel list are channels which are not used by signals (or users) that should be legally protected, and are available to an unlicensed device at a point of time when the unlicensed device accesses the GDB. Otherwise, if the unlicensed device requests information about channels available after a certain lapse of time from a point of time when the unlicensed device accesses the GDB, the WSM may include information about channels and frequencies which are available from the requested time. Alternatively, if the unlicensed device requests the GDB for available channel information, it is possible to transmit information about available channels and frequencies by signaling channels not available to the unlicensed device.

Federal Communications Commission (FCC) TVWS regulations currently define two device types. That is, a personal/portable device with low power, which is carried by a person, and a fixed device with high power, which operates at a fixed location, are defined. The fixed device may be referred to as a fixed STA and the personal/portable device may be referred to as a P/P STA. The fixed STA and P/P STA may correspond to normal STAs (i.e., STAs including an AP and a non-AP) in the WLAN system. When devices of two types operate in the TVWS, different operation rules may be applied thereto. The fixed device transmits/receives a signal at a specific location which is not changed. The fixed device should access the GDB to acquire available channel information to transmit a signal at the specific location. While the fixed device may include a positioning device such as a GPS, an installer may directly input the location of the fixed device to transmit the location information of the fixed device to the GDB. When the installer directly inputs the location of the fixed device, it is assumed that once the fixed device is installed and the location thereof is input, the location does not change. When the location of the fixed device is changed, the changed location should be registered. The fixed device may serve another fixed device of the same type and the P/P device. When the fixed device receives available channel information from the GDB, the fixed device should transmit information about the device type thereof and receive information about available channels which can be directly used thereby. To serve the P/P device, the fixed device should additionally acquire information about available channels which can be used by the P/P device from the GDB or a proxy server connected to the GDB. This is because the fixed device and the P/P device use different channel periods and operate with different maximum allowable transmit powers and different requirements for adjacent channels and thus the respective device types require different available channel lists. For example, the fixed device is allowed to transmit a signal at 512 to 608 MHz and 614 to 698 MHz as well as at 54 to 60 MHz, 76 to 88 MHz, 174 to 216 MHz and 470 to 512 MHz, whereas the P/P device is not allowed to transmit a signal in TVWS bands other than 512 to 608 MHz and 614 to 698 MHz. The fixed device may transmit a signal with higher power than the P/P device and up to 4 watts is allowed for the fixed device as Effective Isotropic Radiated Power (EIRP).

The P/P device may transmit/receive signals at a non-specified location and the location thereof may be changed. The P/P device may be carried by a person and mobility thereof may not be predicted. Frequency bands available to the P/P device are 512 to 608 MHz and 614 to 698 MHz and maximum transmit power thereof is 100 mW (EIRP). That is, the allowable transmit power of the P/P device is limited compared to the fixed device.

The P/P device may be categorized into a mode II device and a mode I device according to whether the P/P device has identification capability, that is, geo-location capability and GDB accessibility through the Internet. The mode II device has geo-location capability and GDB accessibility and may access the GDB to acquire information about channels available at a location thereof and then operate in TVWS at the location. In addition, the mode II device may acquire the available channel information from the GDB and then start communication through a network by transmitting a signal (e.g., enable signal) for instructing to start communication to the mode I device. The mode I device does not need to have geo-location capability or GDB accessibility and operates under the control of the mode II device or a fixed device. The mode I device may acquire available channel information from the mode II device or the fixed device and should periodically check the validity of available channels. In addition, the mode I device may be allowed to operate on an available channel upon confirmation of the device ID thereof. Here, the mode II device or the fixed device may correspond to an enabling STA and the mode I device may correspond to a dependent STA. An enabling signal transmitted from the enabling STA to the dependent STA may correspond to a beacon frame.

A P/P device corresponding to the mode II device may serve another P/P device or a fixed device. In this case, the mode II P/P device may acquire available channel information for the fixed device from the GDB and deliver the available channel information to the fixed device.

The GDB can calculate available channel information at a location requested by an unlicensed device and transmit the information to the unlicensed device in consideration of a channel use schedule and protection contour of an incumbent user such as a DTV or microphone. Parameters considered by the GDB to calculate the available channel information include a device type, operation location, transmit power and spectrum mask. In the FCC regulations, whether or not to use an adjacent channel depends on the device type. For example, when a DTV is using channel 30, the fixed device cannot use channels 29 and 31 even if channels 29 and 31 are not occupied but the P/P device can use these two channels because the fixed device has high transmit power and thus has a high possibility of interfering with an adjacent channel.

While exemplary embodiments of the present invention will be described hereinafter using TVWS as an example of whitespace for convenience, the scope of the present invention is not limited thereto. That is, the scope of the present invention includes exemplary embodiments of the present invention, which are applied to all operations in whitespace controlled by a DB which provides information about available channels at a specific location. For example, permission of operation of an unlicensed device controlled by a GDB is expected in frequency bands not currently corresponding to whitespace but predicted to become whitespace in the further, and exemplary embodiments of the present invention applied thereto are within the scope of the present invention. Further, while the principle of the present invention is described on the basis of final FCC regulations for TVWS, the scope of the present invention is not limited to operations in whitespace bands according to the FCC regulations and includes exemplary embodiments of the present invention implemented in whitespace bands conforming to other regulations.

Acquisition of Available Channel Information by Mode I Device

A description is now given of an exemplary procedure for acquiring available channel information from a mode II device or fixed device by a mode I device operating in a whitespace band.

Figure 5:
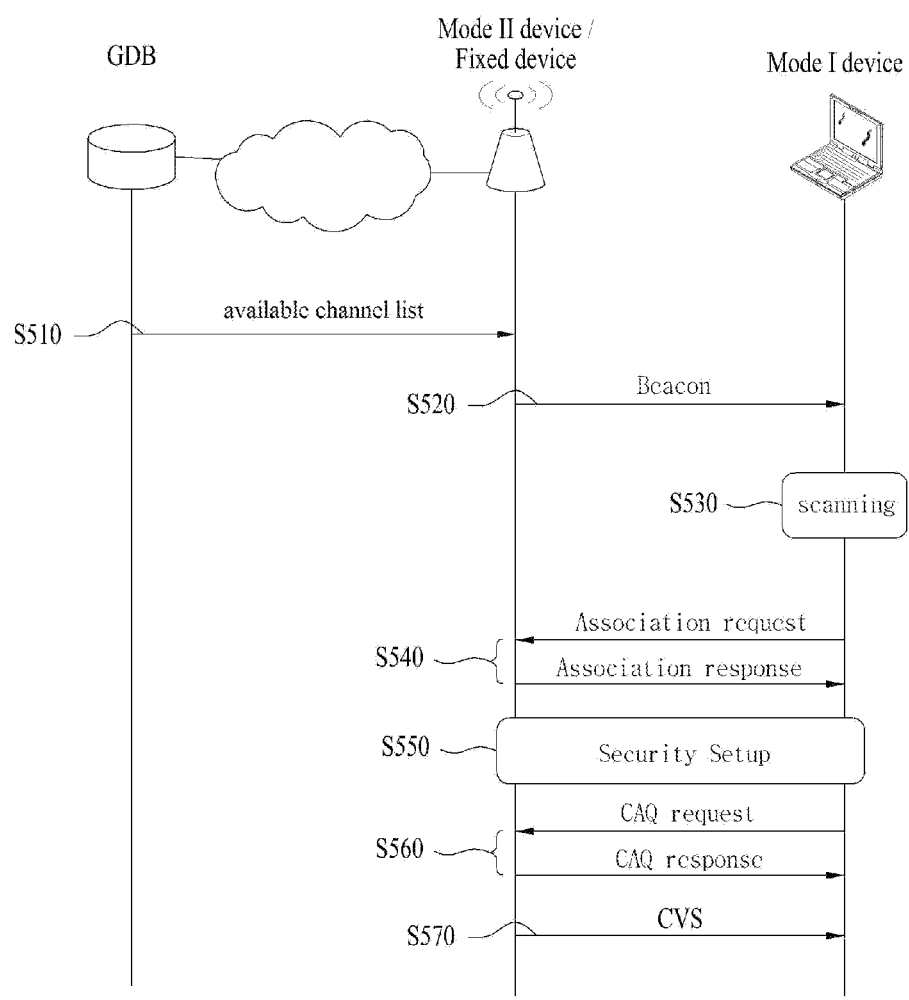
FIG. 5 is a flowchart of an exemplary link setup procedure according to an embodiment of the present invention.

FIG. 5 is a flowchart of an exemplary link setup procedure according to an embodiment of the present invention.

In step S510, a mode II device or fixed device (hereinafter referred to as a mode II device/fixed device) may access a GDB, for example, via the Internet to acquire an available channel list (e.g., WSM) corresponding to a current location thereof.

In step S520, the mode II device/fixed device may configure a BSS by transmitting a beacon. The beacon frame may include information about the available channel list. Furthermore, the beacon frame may be periodically transmitted.

In step S530, a mode I device which desires to participate in the BSS may scan a TVWS. If the mode I device already has an available channel list corresponding to a current location thereof, the mode I device may passively or actively scan only channels on the available channel list. Passive scanning refers to a procedure for listening to a beacon transmitted from the mode II device/fixed device on scanning channels by the mode I device. Active scanning means that the mode I device transmits a probe request frame on scanning channels and receives a probe response frame from the mode II device/fixed device.

Here, the mode I device should operate under the control of the mode II device/fixed device to participate in the BSS. Accordingly, the mode I device should set up a link with the mode II device/fixed device.

In step S540, after scanning is completed, the mode I device may perform an association procedure to participate in the BSS. To this end, the mode I device may transmit an association request frame to the mode II device/fixed device.

After association request/response is successfully completed, a security setup procedure is performed in step S550. The security setup procedure may include, for example, a private key setup procedure through 4-way handshaking using an Extensible Authentication Protocol over LAN (EAPOL) frame. Security setup should be performed between the mode II device/fixed device and the mode I device because integrity check or the like is required when the mode II device/fixed device transmits a WSM to the mode I device.

In step S560, after security setup is completed, the mode I device may transmit a channel availability request frame (or Channel Availability Query (CAQ) request frame) to the mode II device/fixed device to request an available channel list (e.g., WSM). The mode II device/fixed device may transmit a channel availability response frame (or CAQ response frame) to the mode I device to provide an available channel list (e.g., WSM). The mode I device may receive the available channel list (e.g., WSM) to complete the link setup procedure with the mode II device/fixed device. If link setup is completed, the mode I device may transmit and receive data, control and management frames to and from the mode II device/fixed device.

After link setup, as shown in step S570, the mode I device may periodically receive a Contact Verification Signal (CVS) from the mode II device/fixed device. That is, the mode I device (i.e., dependent STA) should be controlled by the mode II device/fixed device (i.e., enabling STA) to operate in a whitespace band, and the mode I device having no GDB accessibility may use the CVS periodically transmitted by the mode II device/fixed device to check the validity of available channels/frequencies. The CVS may function to validly maintain the link setup state. The CVS may include a map ID of the WSM of the mode II device/fixed device. As such, the mode I device may periodically check currently valid channels, and determine a WSM not indicated by the map ID of the CVS, as being invalid. That is, when the mode I device receives a CVS frame, if a map ID thereof is different from the map ID of the WSM of the mode I device, the mode I device may transmit a CAQ request frame to the mode II device/fixed device to request a new available channel list (e.g., WSM).

PPDU Frame Format

A PLCP (Physical Layer Convergence Protocol) Packet Data Unit (PPDU) frame format may be configured to include a Short Training Field (STF), a Long Training Field (LTF), a Signal (SIG) field and a data field. The most basic (e.g., non-High Throughput (HT)) PPDU frame format may be configured to include only a Legacy-STF (L-STF), a Legacy-LTF (L-LTF), a SIG field and a data field. Furthermore, additional (or another-type) STF, LTF and SIG fields may be included between the SIG field and the data field according to the type of the PPDU frame format (e.g., HT-mixed format PPDU, HT-greenfield format PPDU or Very High Throughput (VHT) PPDU).

The STF is a signal for signal detection, Automatic Gain Control (AGC), diversity selection and precise time synchronization, and the LTF is a signal for channel estimation and frequency error estimation. A combination of the STF and the LTF may be referred to as a PCLP preamble which may be a signal for OFDM physical layer synchronization and channel estimation.

The SIG field may include a RATE field and a LENGTH field. The RATE field may include information about modulation and coding rate of data. The LENGTH field may include information about the length of data. Additionally, the SIG field may include parity bits and SIG TAIL bits.

The data field may include a SERVICE field, a PLCP Service Data Unit (PSDU) and PPDU TAIL bits, and may further include padding bits as necessary. Some bits of the SERVICE field may be used for synchronization of a descrambler at a receiver. The PSDU corresponds to a MAC PDU defined in a MAC layer and may include data generated/used by a higher layer. The PPDU TAIL bits may be used to return an encoder to 0 state. The padding bits may be used to adjust the length of the data field to a certain unit.

The MAC PDU is defined according to a variety of MAC frame formats, and a basic MAC frame includes a MAC header, a frame body and a Frame Check Sequence (FCS). The MAC frame may include the MAC PDU and may be transmitted/received using the PSDU of the data field of the PPDU frame format.

Meanwhile, a Null-Data Packet (NDP) frame format refers to a frame format not including data packets. That is, the NDP frame refers to a frame format including only a PLCP header part of a general PPDU format (i.e., STF, LTF and SIG fields) and not including the other part (i.e., data field). The NDP frame may also be called a short frame format.

Figure 6:
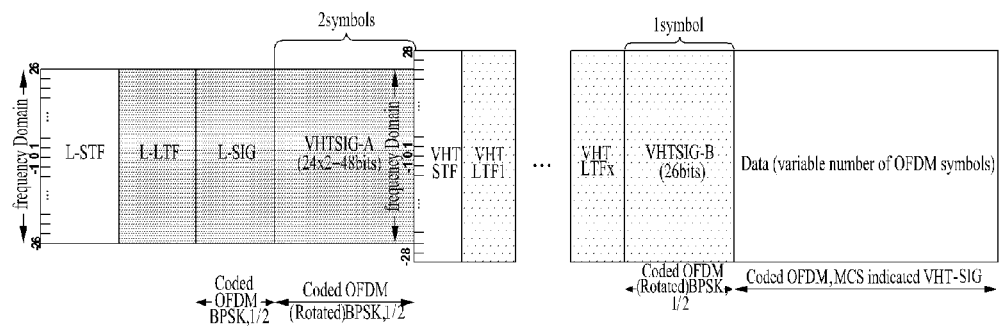
FIGS. 6 to 8 are views for describing the IEEE 802.11ac VHT PPDU frame format.
Figure 7:
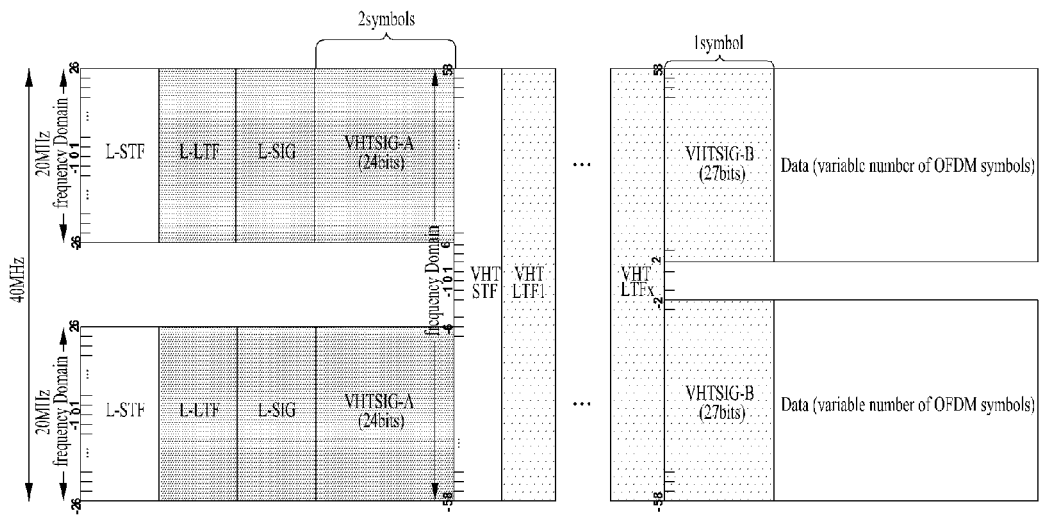
Figure 8:
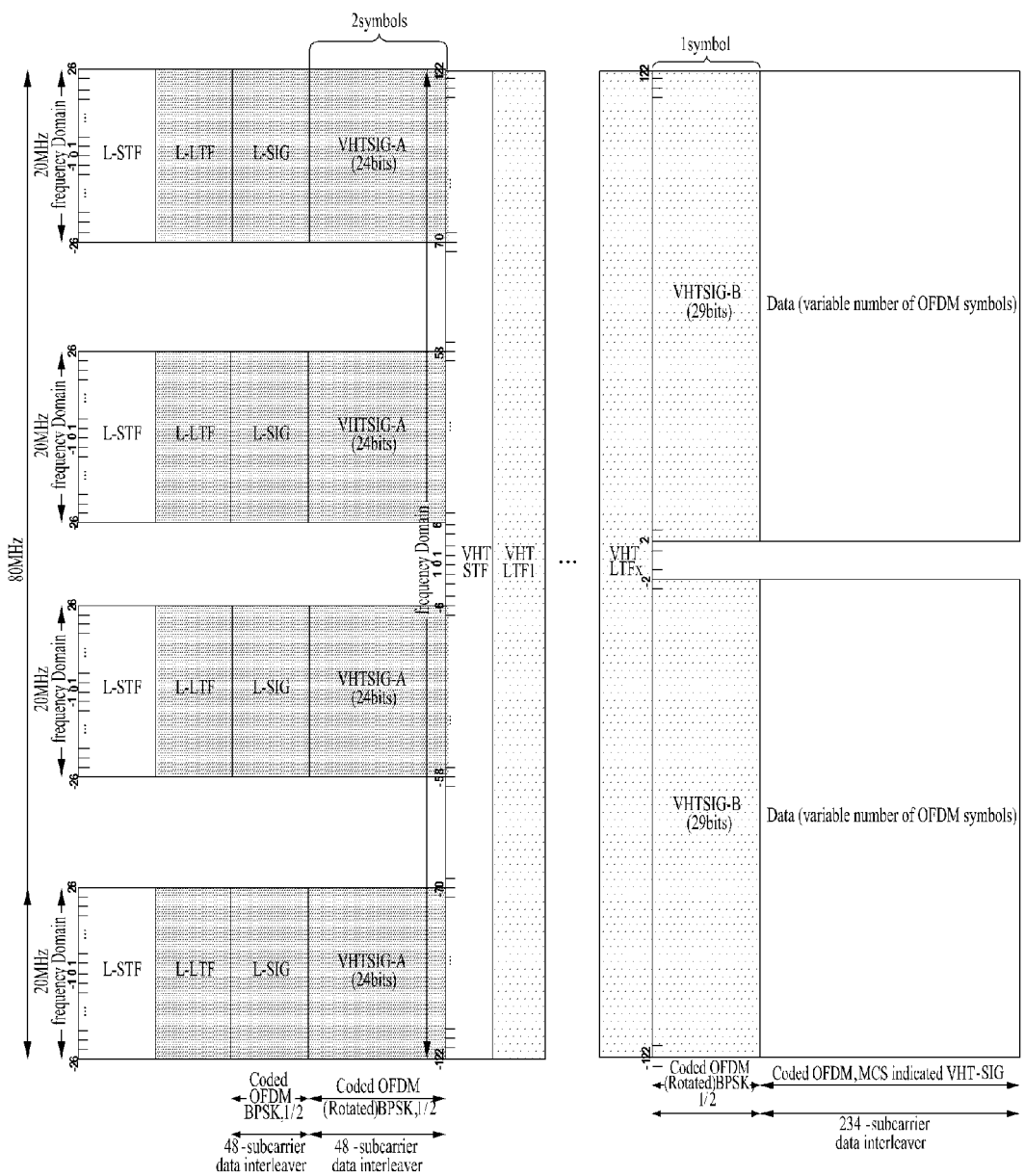

A description is now given of the IEEE 802.11ac VHT PPDU frame format with reference to FIGS. 6 to 8. A Physical (PHY) layer of IEEE 802.11ac supporting VHT may support bandwidths of 20 MHz, 40 MHz, 80 MHz and 160 MHz.

As illustrated in FIGS. 6 to 8, the VHT PPDU frame format may include L-STF, L-LTF, L-SIG, VHT SIG-A, VHT STF, VHT LTF1, . . . , VHT LTFx, VHT SIG-B and Data fields. The L-STF, L-LTF and L-SIG fields may be configured as described above in relation to the general frame format. The VHT SIG-A, VHT STF, VHT LTF1, . . . , VHT LTFx and VHT SIG-B fields are defined for the VHT PPDU format.

The VHT SIG-A field may include information about a length/duration, a channel bandwidth, the number of spatial streams, a group ID and a partial Association ID (AID).

The VHT STF field includes an STF for the VHT PPDU (i.e., signal for signal detection, Automatic Gain Control (AGC), diversity selection and precise time synchronization).

The VHT LTF1, . . . , VHT LTFx fields include an LTF for the VHT PPDU (i.e., signal for channel estimation and frequency error estimation).

The VHT SIG-B field may include MCS bits, TAIL bits and Cyclic Redundancy Check (CRC) bits, and remaining bits may be reserved.

In the 20 MHz VHT PPDU frame format of FIG. 6, the 20 MHz bandwidth is divided into 64 subcarriers in the frequency domain. The L-STF, L-LTF, L-SIF and VHT SIG-A fields are transmitted using subcarrier indices −26 to 26, and the VHT STF, VHT LTF1, . . . , VHT LTFx, VHT SIG-B and Data fields are transmitted using subcarrier indices −28 to 28. Here, subcarrier index 0 corresponds to the center or Direct Current (DC) frequency and is not used for transmission.

In the 40 MHz VHT PPDU frame format of FIG. 7, the 40 MHz bandwidth is divided into 128 subcarriers in the frequency domain. The L-STF, L-LTF, L-SIF and VHT SIG-A fields are transmitted using subcarrier indices −58 to −6 and 6 to 58. The VHT STF, VHT LTF1, . . . , VHT LTFx fields are transmitted using subcarrier indices −58 to 58. The VHT SIG-B and Data fields are transmitted using subcarrier indices −58 to −2 and 2 to 58. Here, subcarrier index 0 corresponds to the center (or DC) frequency and is not used for transmission.

In the 80 MHz VHT PPDU frame format of FIG. 8, the 80 MHz bandwidth is divided into 256 subcarriers in the frequency domain. The L-STF, L-LTF, L-SIF and VHT SIG-A fields are transmitted using subcarrier indices −122 to −70, −58 to −6, 6 to 58 and 70 to 122. The VHT STF, VHT LTF1, . . . , VHT LTFx fields are transmitted using subcarrier indices −122 to 122. The VHT SIG-B and Data fields are transmitted using subcarrier indices −122 to −2 and 2 to 122. Here, subcarrier index 0 corresponds to the center (or DC) frequency and is not used for transmission.

Furthermore, in the 160 MHz PPDU frame format (not shown), the 160 MHz bandwidth may be divided into 512 subcarriers in the frequency domain. The L-STF, L-LTF, L-SIF and VHT SIG-A fields are transmitted using subcarrier indices −250 to −198, −186 to −134, −122 to −70, −58 to −6, 6 to 58, 70 to 122, 134 to 186 and 198 to 250. The VHT STF, VHT LTF1, . . . , VHT LTFx fields are transmitted using subcarrier indices −250 to 250. The VHT SIG-B and Data fields are transmitted using subcarrier indices −250 to −130, −126 to −6, 6 to 126 and 130 to 250. Here, subcarrier index 0 corresponds to the center (or DC) frequency and is not used for transmission.

Channelization of WLAN Operating Channel in TVWS

A legacy WLAN system can provide various transfer rates in unlicensed bands defined at an operating frequency such as 2.4 GHz, 5 GHz or 60 GHz. The operating frequency of a WLAN system using a TVWS band (e.g., IEEE 802.11af system) should be defined in consideration of different TV bands defined for different countries.

For example, in the United States, a TV channel has a bandwidth of 6 MHz, and WLAN services can be provided under the control of a GDB in 54-60 MHz, 76-88 MHz, 174-216 MHz, 512-608 MHz, and 614-698 MHz bands. Table 1 shows TV channels available in the United States.

TABLE 1

| TV Channel No | Freq. band (MHz) | Center Freq. (MHz) |
|---|---|---|
| 2 | 54-60 | 57 |
| 5 | 76-82 | 79 |
| 6 | 82-88 | 85 |
| 7 | 174-180 | 177 |
| 8 | 180-186 | 183 |
| 9 | 186-192 | 189 |
| 10 | 192-198 | 195 |
| 11 | 198-204 | 201 |
| 12 | 204-210 | 207 |
| 13 | 210-216 | 213 |
| 14 | 470-476 | 473 |
| 15 | 476-482 | 479 |
| 16 | 482-488 | 485 |
| 17 | 488-494 | 491 |
| 18 | 494-500 | 497 |
| 19 | 500-506 | 503 |
| 20 | 506-512 | 509 |
| 21 | 512-518 | 515 |
| 22 | 518-524 | 521 |
| 23 | 524-530 | 527 |
| 24 | 530-536 | 533 |
| 25 | 536-542 | 539 |
| 26 | 542-548 | 545 |
| 27 | 548-554 | 551 |
| 28 | 554-560 | 557 |
| 29 | 560-566 | 563 |
| 30 | 566-572 | 569 |
| 31 | 572-578 | 575 |
| 32 | 578-584 | 581 |
| 33 | 584-590 | 587 |
| 34 | 590-596 | 593 |
| 35 | 596-602 | 599 |
| 36 | 602-608 | 605 |
| 38 | 614-620 | 617 |
| 39 | 620-626 | 623 |
| 40 | 626-632 | 629 |
| 41 | 632-638 | 635 |
| 42 | 638-644 | 641 |
| 43 | 644-650 | 647 |
| 44 | 650-656 | 653 |
| 45 | 656-662 | 659 |
| 46 | 662-668 | 665 |
| 47 | 668-674 | 671 |
| 48 | 674-680 | 677 |
| 49 | 680-686 | 683 |
| 50 | 686-692 | 689 |
| 51 | 692-698 | 695 |

For operation in this TVWS, a method for channelizing the PHY structure defined in IEEE 802.11ac into 4 MHz, 8 MHz and 16 MHz bandwidth channels through 5× down-clocking, or a method for channelizing the PHY structure using only 4 MHz channels has been suggested. Furthermore, a method for channelizing the PHY structure of IEEE 802.11ac into 5 MHz bandwidth channels through 4× or 8× down-clocking has also been suggested.

Meanwhile, in the United Kingdom, a TV channel has a bandwidth of 8 MHz, and WLAN services can be provided under the control of a GDB in 480-790 MHz band excluding 550-614 MHz band. For operation in this TVWS, a method for channelizing the PHY structure of IEEE 802.11ac into 40/6 MHz (=approximately 6.67 MHz) bandwidth channels through 6× down-clocking has been suggested.

Operating Class

Channels in which the IEEE 802.11 system operates can be defined as an operating class. Sets of rules applied to wireless devices are fixed, and an index indicating one of the sets of rules can be defined to correspond to an operating class. For example, a set of rules may include a channel starting frequency, channel spacing, a channel set and a behavior limits set. That is, the operating class can be a predetermined channel group defined by a specific frequency, a bandwidth and a channel number. Simply, the operating class can define a group of channel(s) following certain rules. Alternatively, the operating class can also be expressed as a set of parameters for specifying channels. For example, in the United States, the operating class may be defined as shown in Table 2.

Table 2 shows exemplary definition of operating classes in the United States.

TABLE 2

| Operating class | Global operating class | Channel starting frequency (GHz) | Channel spacing (MHz) | Channel set | Behavior limits set |
|---|---|---|---|---|---|
| 1 | 115 | 5 | 20 | 36, 40, 44, 48 | |
| 2 | 118 | 5 | 20 | 52, 56, 60, 64 | DFS_50_100_Behavior |
| ... | ... | ... | ... | ... | ... |

For example, the operating classes shown in Table 2 can be interpreted as described below. For instance, a total number of available WLAN channels (i.e., the number of elements of the channel set item) for US operating class index 1 is 4, and the channel spacing item shows that the bandwidth of each channel is 20 MHz. Furthermore, the center frequency of each channel may be determined based on Equation 1.

Center frequency=Channel starting frequency+
(0.005*Channel set value)     [Equation 1]

For example, the center frequency of channel 36 is 5.18 GHz (=5+0.005*36), the center frequency of channel 40 is 5.2 GHz (=5+0.005*40), the center frequency of channel 44 is 5.22 GHz (=5+0.005*44), and the center frequency of channel 48 is 5.24 GHz (=5+0.005*48).

Similarly, the location and bandwidth of each channel for US operating class index 2 may be specified. DFS_50_100_Behavior of the behavior limits set for US operating class index 2 indicates that an STA operating in a band where a radiolocation radar is defined as a primary device has in-service monitoring requirements for 50-100 μs radar pulses. In addition, various other behavior limits can be defined.

Information about the operating class may be included in a beacon frame or a probe response frame. As such, an STA having received the beacon frame or the probe response frame may acquire information about operating channels supported by a corresponding AP or BSS.

Definition of Operating Classes in TVWS

For the IEEE 802.11 system, center frequencies and available bandwidths in each country are defined as operating classes, and each STA can configure and transmit an operating channel (or, WLAN channel) according to rules based on the operating classes.

However, IEEE 802.11af for defining operation in TVWS does not define operating classes. Since all channels used in the IEEE 802.11 series WLAN system need to be expressed as operating classes as described above, operating classes applied to the WLAN system operating in TVWS (e.g., IEEE 802.11af system) need to be defined.

System parameters shown in Table 3 are assumed in the following description. However, the scope of the present invention is not limited thereto and the principle proposed by the present invention is equally applicable to systems defined by other parameters.

TABLE 3

| Parameter | Description | Example |
|---|---|---|
| B | TV channel bandwidth [MHz] | 6 MHz (US, Korea) |
| W | Channel spacing [MHz] | 5 MHz (802.11 ac 4x down-clocking) |
| $n_k$ | k-th element of Channel set | 36, 40, 44, 48 (Operating class 1) |
| M | Channel number multiplier | 0.005 GHz (default value as in 802.11) |
| $f_s$ | Channel starting frequency | 5 GHz (Operating class 1) |
| $f_c^k$ | Center frequency of k-th channel | 5.18 GHz, 5.20 GHz, 5.22 GHz, 5.24 GHz (Operating class 1) |

As shown in Table 3, the bandwidth of a basic channel unit in TVWS is assumed as W MHz (e.g., 5 MHz) and the bandwidth of each TV channel is assumed as B MHz (e.g., 6 MHz in US and Korea, and 8 MHz in UK and Europe). Furthermore, W≤B is also assumed.

All of the above 6 parameters of Table 3 should be defined to define an operating class. Among the parameters, since B is already determined per country, B is assumed as a given value and the present invention proposes a method for determining the other parameters.

The present invention proposes all possible channelization methods for a WLAN operating channel in TVWS to determine W and $f_c^k$. Then, the other parameters $n_k$, m and $f_s$ are defined thereafter to define a complete operating class. W and $f_c^k$ A description is now given of a channelization method in the case in which the bandwidth of a WLAN operating channel operating in TVWS is W MHz.

Figure 9:
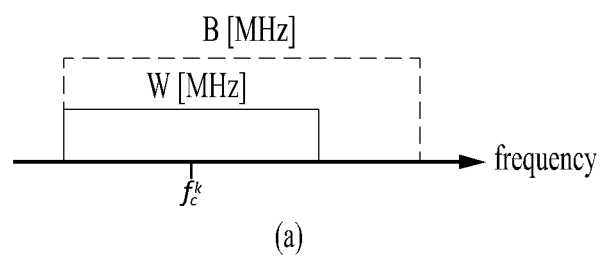
FIG. 9 is a view for describing channelization methods of a WLAN operating channel having a bandwidth of W MHz.
Figure 9:
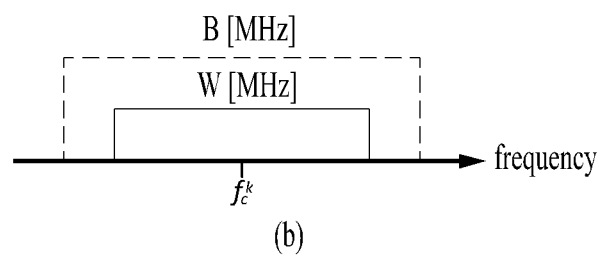
Figure 9:
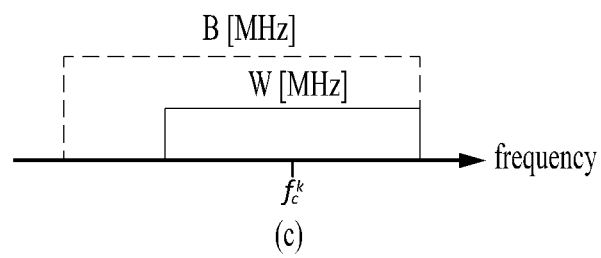

FIG. 9 is a view for describing channelization methods of a WLAN operating channel having a bandwidth of W MHz.

FIG. 9(a) illustrates a low frequency alignment method. That is, the lowest frequency of a WLAN operating channel is adjusted to the lowest frequency of a TV channel.

FIG. 9(b) illustrates a middle frequency alignment method. That is, the center frequency of a WLAN operating channel is adjusted to the center frequency of a TV channel.

FIG. 9(c) illustrates a high frequency alignment method. That is, the highest frequency of a WLAN operating channel is adjusted to the highest frequency of a TV channel.

In the channelization methods of FIGS. 9(a) to 9(c), the center frequency $f_c^k$ of a k-th WLAN operating channel may be defined as shown in Table 4.

TABLE 4

| FIG. 9(a) | Equation 2-1 | $f_c^k = f_s + m * n_k - (B - W)/2$ |
| FIG. 9(b) | Equation 2-2 | $f_c^k = f_s + m * n_k$ |
| FIG. 9(c) | Equation 2-3 | $f_c^k = f_s + m * n_k + (B - W)/2$ |

In Table 4, −(B−W)/2 of Equation 2-1, 0 of Equation 2-2 and (B−W)/2 of Equation 2-3 may be called channel center frequency correction values.

A description is now given of a channelization method in the case in which the bandwidth of a WLAN operating channel operating in TVWS is 2 W MHz. In this case, it is assumed that 2 contiguous TV channels (i.e., 2*B MHz channel) are available.

Figure 10:
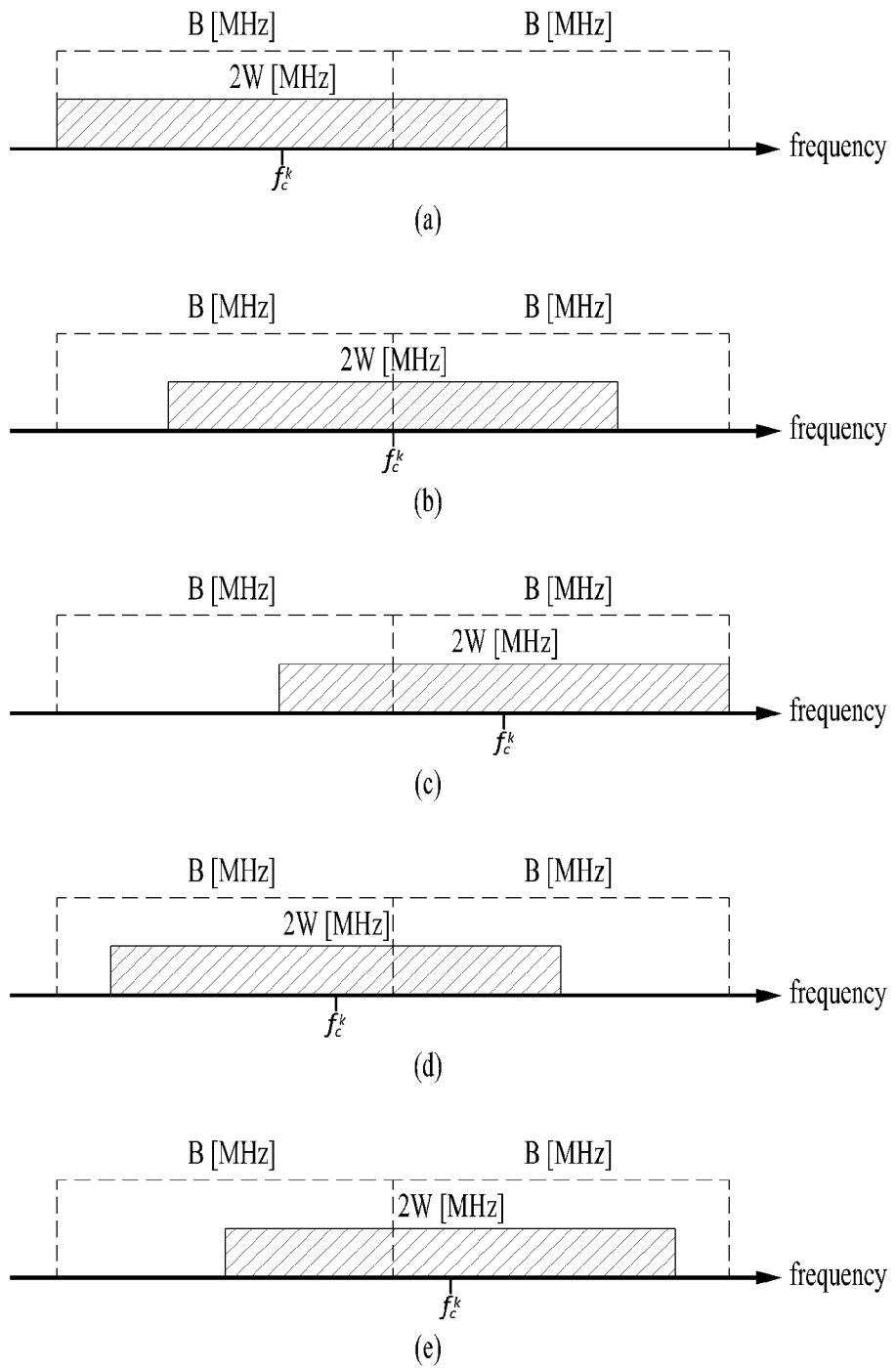
FIG. 10 is a view for describing channelization methods of a WLAN operating channel having a bandwidth of 2 W MHz.

FIG. 10 is a view for describing channelization methods of a WLAN operating channel having a bandwidth of 2 W MHz.

FIG. 10(a) illustrates a low frequency alignment method. That is, the lowest frequency of a WLAN operating channel is adjusted to the lowest frequency of 2 contiguous TV channels.

FIG. 10(b) illustrates a middle frequency alignment method. That is, the center frequency of a WLAN operating channel is adjusted to the center frequency of (or the boundary between) 2 contiguous TV channels.

FIG. 10(c) illustrates a high frequency alignment method. That is, the highest frequency of a WLAN operating channel is adjusted to the highest frequency of 2 contiguous TV channels.

FIG. 10(d) illustrates a middle frequency alignment method based on a low-frequency basic channel unit. That is, the center frequency of a low-frequency W-MHz operating channel of 2 W-MHz WLAN operating channels is adjusted to the center frequency of a low-frequency TV channel (or a left TV channel in FIG. 10(d)) of 2 contiguous TV channels. A higher-frequency W-MHz operating channel is located (or shifted) to be contiguous in frequency to the low-frequency W-MHz WLAN operating channel.

FIG. 10(e) illustrates a middle frequency alignment method based on a high-frequency basic channel unit. That is, the center frequency of a high-frequency W-MHz operating channel of 2 W-MHz WLAN operating channels is adjusted to the center frequency of a high-frequency TV channel (or a right TV channel in FIG. 10(e)) of 2 contiguous TV channels. A lower-frequency W-MHz operating channel is located (or shifted) to be contiguous in frequency to the high-frequency W-MHz WLAN operating channel.

In the channelization methods of FIGS. 10(a) to 10(e), the center frequency $f_c^k$ of a k-th WLAN operating channel may be defined as shown in Table 5.

TABLE 5

| FIG. 10(a) | Equation 3-1 | $f_c^k = f_s + m * n_k - B/2 + W$ |
| FIG. 10(b) | Equation 3-2 | $f_c^k = f_s + m * n_k + B/2$ |
| FIG. 10(c) | Equation 3-3 | $f_c^k = f_s + m * n_k + 3B/2 - W$ |
| FIG. 10(d) | Equation 3-4 | $f_c^k = f_s + m * n_k + W/2$ |
| FIG. 10(e) | Equation 3-5 | $f_c^k = f_s + m * n_k + B - W/2$ |

In Table 5, channel center frequency correction values in Equations 3-1 to 3-5 may be −B/2+W, B/2, 3B/2−W, W/2 and B−W/2, respectively.

That is, Equations 2-1 to 2-3 and 3-1 to 3-5 of Tables 4 and 5 may be generalized into $f_c^k = f_s + m*n_k +$ Correction. Here, the value of Correction may be given as −(B−W)/2, 0, (B−W)/2, −B/2+W, B/2, 3B/2−W, W/2 and B−W/2 for respective equations.

In the exemplary equations of Tables 4 and 5 for determining $f_c^k$, $f_s$ is defined based on the center frequency of an available TV channel as in the second channelization method of Table 4 (i.e., FIG. 9(b)). In this case, the examples in which a WLAN operating channel is not located at the center frequency of a TV channel (i.e., FIGS. 9(a), 9(b) and 10(a) to 10(e)) do not correspond to an accurate starting frequency value and thus correction thereof is needed. A detailed description thereof will be given below.

$n_k$, m and $f_s$

A description is now given of a method for determining m (i.e., the spacing between WLAN operating channels). TV channelization of each country should be considered to determine m. For example, in the United States, the spacing between most TV channels (i.e., $\Delta fc = fc(k) - fc(k-1)$) is defined as 6 MHz, but the spacing between some intermediate TV channels is defined as 22 MHz (between channel 2 and channel 5), 92 MHz (between channel 6 and channel 7), 260 MHz (between channel 13 and channel 14) or 12 MHz (between channel 36 and channel 38) as shown in Table 1.

m denotes the spacing between WLAN operating channels, but can be determined as a single value in further consideration of the spacing between TV channels. To this end, when the spacing between TV channels is defined as one of a plurality of values, the value m may be defined as the greatest common divisor of the plurality of values. For example, in the United States, the spacing between TV channels is defined as one of 5 values such as 6, 22, 92, 260 and 12 MHz. Considering this, the maximum value of m may be defined as 2 MHz (i.e., the greatest common divisor of 6, 22, 92, 260 and 12 MHz). Additionally, the value m may also be defined as one of divisors of the greatest common divisor (e.g., 1, 0.5, 0.4, 0.2 and 0.1 if the greatest common divisor is 2).

Alternatively, operating classes may be classified based on periods having different channel spacing values instead of grouping channels into one operating class. That is, periods having different TV channel spacing values may be classified and WLAN operating channels belonging to one operating class may be defined in a frequency band of TV channels having the same channel spacing value. For example, in the United States, a first operating class may be defined to include WLAN operating channels defined in a frequency band corresponding to TV channel 2, a second operating class may be defined to include WLAN operating channels defined in a frequency band corresponding to TV channels 5 and 6, a third operating class may be defined to include WLAN operating channels defined in a frequency band corresponding to TV channels 7 to 13, a fourth operating class may be defined to include WLAN operating channels defined in a frequency band corresponding to TV channels 14 to 36, and a fifth operating class may be defined to include WLAN operating channels defined in a frequency band corresponding to TV channels 38 to 51. When operating classes are classified in this manner, TV channels within one operating class have the same spacing value of 6 MHz. In this case, m=6 MHz may be defined. Additionally, the value m may also be defined as one of divisors of 6 MHz (e.g., 1, 2, 3, 0.5, 0.4, 0.3, 0.2 and 0.1).

Furthermore, if there is a restriction condition depending on frequency separation due to regulations of each country, this should be considered to determine the value m. For example, the United Kingdom has a regulation by which channel allocation or transmit power limit varies based on a unit (e.g., 200 kHz) less than a TV channel bandwidth (i.e., 8 MHz). In this case, the value m may be defined as the corresponding unit (e.g., 200 kHz) or one of divisors thereof (e.g., 200 kHz or 100 kHz).

A description is now given of a method for determining $f_s$.

All channels of a WLAN system following IEEE 802.11 series should be expressed in the form of Equation 2-2 (i.e., $f_c^k = f_s + m \ast n_k$) using parameters of an operating class. The form of Equation 2-2 can accurately express a WLAN operating channel when the location of the center frequency of the WLAN operating channel is the same as the location of the center frequency of a TV channel as in the example of FIG. 9(b). However, the WLAN operating channel may not be accurately expressed using the form of Equation 2-2 in the case of another channelization method (e.g., FIG. 9(a) or FIG. 9(c)) because, when a starting frequency $f_s$ serving as a reference point for determining the center frequency of a channel differs from that of another channel (e.g., the FIG. 9(a) or FIG. 9(c)), the location of a WLAN operating channel may not be appropriately expressed in the form of Equation 2-2.

Accordingly, in the present invention, the value $f_s$ is determined based on the second channelization method (e.g., the channelization method of FIG. 9(b)), and then is corrected to determine $f_s$ of another channelization method (i.e., corrected $f_s$ (=$f_s'$)). In this case, $n_k$ may not be determined as different values based on the channelization methods but may be used as the same value. That is, according to this method, $f_s$ may be corrected based on the channelization methods and $n_k$ may be used as the same value irrespective of the channelization methods. Alternatively, $f_s$ may be determined as the same value irrespective of the channelization methods and then $n_k$ may be determined differently for the channelization methods.

To determine $f_s$ and $n_k$ in this manner, $f_s$ should be initially determined based on the second channelization method (e.g., the channelization method of FIG. 9(b)). Broadly, there are two methods for determining $f_s$.

The first method is a method for determining $f_s$, which makes the values $n_k$ integers (or natural numbers), among simple reference values (e.g., 5 GHz of Table 2) close to a bandwidth for defining an operating channel. For example, in the United States, TV channels are available from 54 MHz and thus $f_s$=50 MHz may be defined. After that, values $n_k$ are calculated using already determined parameters to satisfy the form of Equation 2-2. If the values $n_k$ are not integers (or natural numbers), the value $f_s$ is adjusted to select the value $f_s$, which makes the values $n_k$ integers (or natural numbers).

The second method is a method for fixing $n_1=1$ and determining $f_s$ using Equation 2-2. For example, when TV channels are given as in the United States and m=2 MHz is determined, Equation 2-2 may be modified and thus $f_s = f_c^k - m \ast n_k = f_c^1 - m \ast n_1 = 57 - 2 \ast 1 = 55$ [MHz] may be determined. If $f_s$ is determined in this manner, the value $n_k$ may be relatively simply calculated starting from 1, and may be guaranteed to always be a natural number.

If $f_s$ is defined to use the same value irrespective of the channelization methods, $f_s$ does not need to be corrected and thus the value $n_k$ may be directly determined.

However, if $f_s$ is defined to use a value corrected based on a channelization method, corrected $f_s$ (i.e., $f_s'$) should be determined. Corrected $f_s$ may be determined as shown in Table 6.

TABLE 6

| | Before correction | After correction (Form of Equation 1) | $f_s'$ (Corrected $f_s$) |
|---|---|---|---|
| Equation 2-1 | $f_c^k = f_s + m \ast n_k - (B-W)/2$ | $f_c^k = f_s' + m \ast n_k$ | $f_s' = f_s - (B-W)/2$ |
| Equation 2-3 | $f_c^k = f_s + m \ast n_k + (B-W)/2$ | $f_c^k = f_s' + m \ast n_k$ | $f_s' = f_s + (B-W)/2$ |
| Equation 3-1 | $f_c^k = f_s + m \ast n_k - B/2 + W$ | $f_c^k = f_s' + m \ast n_k$ | $f_s' = f_s - B/2 + W$ |
| Equation 3-2 | $f_c^k = f_s + m \ast n_k + B/2$ | $f_c^k = f_s' + m \ast n_k$ | $f_s' = f_s + B/2$ |
| Equation 3-3 | $f_c^k = f_s + m \ast n_k + 3B/2 - W$ | $f_c^k = f_s' + m \ast n_k$ | $f_s' = f_s + 3B/2 - W$ |

TABLE 6-continued

| | Before correction | After correction (Form of Equation 1) | $f_s'$ (Corrected $f_s$) |
|---|---|---|---|
| Equation 3-4 | $f_c^k = f_s + m * n_k + W/2$ | $f_c^k = f_s' + m * n_k$ | $f_s' = f_s + W/2$ |
| Equation 3-5 | $f_c^k = f_s + m * n_k + B - W/2$ | $f_c^k = f_s' + m * n_k$ | $f_s' = f_s + B - W/2$ |

As shown in Table 6, correction of $f_s$ may be understood as correction by a difference value (or offset) between the center frequency of a TV channel and the center frequency of an operating channel in the examples described in FIGS. 9 and 10.

Subsequently, $n_k$ is determined. Based on the values determined in the previous procedure, $n_k$ may be calculated by substituting each value k into $n_k=(f_c^k-f_s)/m$ modified from Equation 2-2. Since all values $n_k$ should be natural numbers, if the values $n_k$ are not natural numbers, $f_s$ is shifted or the value m is changed to a smaller value, and then the values $n_k$ are calculated again until natural numbers are calculated.

Tables 7 and 8 show exemplary operating classes determined according to the above-described proposals of the present invention. Available TV channels are based on the United States, and a channelization method is assumed as that of FIG. 9(b) or FIG. 10(b).

TABLE 7

| Channel starting frequency (GHz) | Channel number multiplier (MHz) | Channel spacing (MHz) | Channel set |
|---|---|---|---|
| 0.055 | 2 | 5 | 1, 12, 15, 61, 64, 67, 70, 73, 76, 79, 209, 212, 215, 218, 221, 224, 227, 230, 233, 236, 239, 242, 245, 248, 251, 254, 257, 260, 263, 266, 269, 272, 275, 281, 284, 287, 290, 293, 296, 299, 302, 305, 308, 311, 314, 317, 320 |

TABLE 8

| Channel starting frequency (GHz) | Channel number multiplier (MHz) | Channel spacing (MHz) | Channel set |
|---|---|---|---|
| 0.08 | 2 | 10 | 1, 50, 53, 56, 59, 62, 65, 198, 201, 204, 207, 210, 213, 216, 219, 222, 225, 228, 231, 234, 237, 240, 243, 246, 249, 252, 255, 258, 261, 270, 273, 276, 279, 282, 285, 288, 291, 294, 297, 300, 303, 306 |

In the case of Table 7, if each parameter is substituted into Equation 2-2 ($f_c^k=f_s+m*n_k$), WLAN operating channels may be expressed in a form in which the center frequency of a WLAN operating channel having a bandwidth of 5 MHz is located at the center frequency of each TV channel of Table 1. For example, the center frequency of the WLAN operating channel having a bandwidth of 5 MHz is calculated as 55+2*1=57 [MHz], 55+2*12=79 [MHz], 55+2*15=85 [MHz], . . . .

Furthermore, in the case of Table 8, if each parameter is substituted into Equation 3-2 ($f_c^k=f_s+m*n_k+B/2$), WLAN operating channels may be expressed in a form in which the center frequency of a WLAN operating channel having a bandwidth of 10 MHz is located at the center frequency of each TV channel of Table 1. For example, the center frequency of the WLAN operating channel having a bandwidth of 10 MHz is calculated as 80+2*1+6/2=85 [MHz], 80+2*50+6/2=183 [MHz], 80+2*53+6/2=189 [MHz], . . . .

Figure 11:
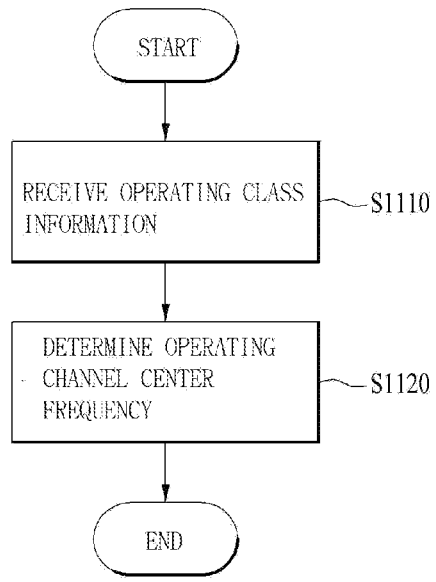
FIG. 11 is a flowchart of a method for determining an operating channel, according to an embodiment of the present invention.

FIG. 11 is a flowchart of a method for determining an operating channel, according to an embodiment of the present invention.

In step S1110, an STA may receive information about an operating class. The operating class may be configured as proposed by the present invention and may be defined particularly for a WLAN system operating under the control of a GDB in TVWS. The information about the operating class may indicate parameters necessary to determine an operating channel (e.g., channel starting frequency, channel spacing, channel set, etc.). The information about the operating class may be received from an AP in a beacon frame or a probe response frame.

In step S1120, the STA may determine an operating channel using the parameters indicated by the information about the operating class. Specifically, the STA may determine the frequency location (i.e., center frequency) of the operating channel based on the values of the parameters indicated by the operating class and the equation proposed by the present invention, i.e., $f_c^k=f_s+m*n_k+$Correction (here, the values of correction are as defined in Equations 2-1 to 2-3 and 3-1 to 3-5).

The method described above with reference to FIG. 11 may be implemented in such a manner that the afore-described embodiments of the present invention are applied thereto independently or in combination.

Figure 12:
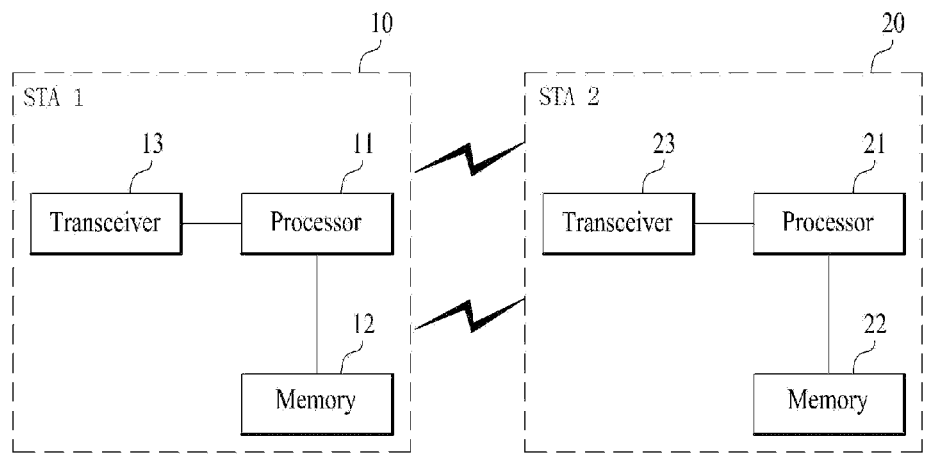
FIG. 12 is a block diagram of wireless devices according to an embodiment of the present invention.

FIG. 12 is a block diagram of wireless devices according to an embodiment of the present invention.

A first STA 10 may include a processor 11, a memory 12 and a transceiver 13. A second STA 20 may include a processor 21, a memory 22 and a transceiver 23. The transceivers 13 and 23 may transmit/receive radio signals and implement a physical layer according to, for example, IEEE 802. The processors 11 and 21 may be connected to the transceivers 13 and 23 to implement a physical layer and/or a MAC layer according to IEEE 802. The processors 11 and 21 may be configured to perform operations according to the afore-described embodiments of the present invention. Furthermore, modules for implementing operations of the first and second STAs 10 and 20 according to the afore-described embodiments of the present invention may be stored in the memories 12 and 22 and executed by the processors 11 and 21. The memories 12 and 22 may be included in the processors 11 and 21 or provided outside the processors 11 and 21 and connected to the processors 11 and 21 via known means.

The configuration of the above-described wireless devices may be implemented in such a manner that the afore-described embodiments of the present invention are applied thereto independently or in combination. Repeated descriptions thereof are not given for clarity.

The afore-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. for performing the above-described functions or operations. Software code may be stored in a memory unit and executed by a processor. The memory unit may be located inside or outside the processor and exchange data with the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The afore-described embodiments of the present invention are focused on the IEEE 802.11 system, but are equally applicable to various mobile communication systems.

The invention claimed is:

1. A method for a first station (STA) to transmit a wireless signal through an operating channel to a second STA in a TV Whitespace (TVWS) Wireless Local Area Network (WLAN) system, the method including:
   receiving, by the first STA, a first wireless signal including information about an index indicating an operating class including parameters of channel starting frequency, channel spacing, and channel set;
   determining, by the first STA, a center frequency of the operating channel based on at least one of the parameters indicated by the index of the operating class,
   wherein the center frequency of the operating channel is determined based on $f_c^k = f_s \, m*n_k + \text{Correction}$, where:
      $f_c^k$ is a center frequency of a k-th operating channel,
      $f_s$ is the channel starting frequency,
      m is a multiplier of $n_k$,
      $n_k$ is an index related to the k-th operating channel, and
      Correction is a correction value of the center frequency; and
   transmitting, from the first STA to the second STA, a second wireless signal through the operating channel having the determined center frequency.

2. The method according to claim 1, wherein:
   Correction has a value of 0 if the operating channel is composed of one basic channel unit; and
   Correction has a value of the (basic channel unit)/2 if the operating channel is composed of two contiguous basic channel units.

3. The method according to claim 1, wherein m is determined based on spacing between adjacent TV channels.

4. The method according to claim 1, wherein m is a greatest common divisor of a plurality of values of spacing between adjacent TV channels.

5. The method according to claim 1, wherein m is 6.

6. The method according to claim 1, wherein $n_k$ is a natural number.

7. The method according to claim 1, wherein a single operating class index indicates a plurality of different channel starting frequency values.

8. The method according to claim 1, wherein, when the operating channel is composed of one basic channel unit, Correction:
   has a value of $-(B-W)/2$ in a low frequency alignment channelization method;
   has a value of 0 in a middle frequency alignment channelization method; and
   has a value of $(B-W)/2$ in a high frequency alignment channelization method,
   where:
      B is a bandwidth of a TV channel, and
      W is a bandwidth of the operating channel.

9. The method according to claim 1, wherein, when the operating channel is composed of two contiguous basic channel units, Correction:
   has a value of $-B/2+W$ in a low frequency alignment channelization method;
   has a value of $B/2$ in a middle frequency alignment channelization method;
   has a value of $3B/2-W$ in a high frequency alignment channelization method;
   has a value of $W/2$ in a middle frequency alignment channelization method based on a low-frequency basic channel unit; and
   has a value of $B-W/2$ in a middle frequency alignment channelization method based on a high-frequency basic channel unit,
   where:
      B is a bandwidth of a TV channel, and
      W is a bandwidth of the operating channel.

10. The method according to claim 1, wherein the information about the index indicating the operating class is received in a beacon frame or a probe response frame from an Access Point (AP).

11. A first Station (STA) apparatus for transmitting wireless signals through an operating channel to a second STA in a TV Whitespace (TVWS) Wireless Local Area Network (WLAN) system, the first STA apparatus including:
   a transceiver; and
   a processor configured to:
      receive, via the transceiver, a first wireless signal including information about an index indicating an operating class including parameters of channel starting frequency, channel spacing, and channel set; and
      determine a center frequency of the operating channel based on at least one of the parameters indicated by the index of the operating class,
      wherein the center frequency of the operating channel is determined based on $f_c^k = f_s \, m*n_k + \text{Correction}$,
      where:
         $f_c^k$ is a center frequency of a k-th operating channel,
         $f_s$ is the channel starting frequency,
         m is a multiplier of $n_k$,
         $n_k$ is an index related to the k-th operating channel, and
         Correction is a correction value of the center frequency, and
      wherein the processor is further configured to control the transceiver to transmit a second wireless signal through the operating channel having the determined center frequency.

* * * * *